United States Patent
Spieth

(10) Patent No.: US 7,650,964 B2
(45) Date of Patent: Jan. 26, 2010

(54) ARRANGEMENT OF PARTS AND A RESPECTIVE MANUFACTURING METHOD

(75) Inventor: Arnulf Spieth, Hochdorf (DE)

(73) Assignee: J. Eberspaecher GmbH & Co. KG, Esslingen (DE)

( * ) Notice: Subject to any disclaimer, the term of this patent is extended or adjusted under 35 U.S.C. 154(b) by 260 days.

(21) Appl. No.: 11/731,995

(22) Filed: Apr. 2, 2007

(65) Prior Publication Data

US 2007/0241168 A1    Oct. 18, 2007

(51) Int. Cl.
 *F01N 5/00* (2006.01)
 *B21D 51/16* (2006.01)

(52) U.S. Cl. ............... 181/212; 29/890.08; 29/890.039; 29/425; 219/136; 219/137 R; 228/164; 228/165; 428/544; 428/545; 428/586

(58) Field of Classification Search .................. 181/212, 181/264, 370, 268, 281; 29/890.08, 890.039, 29/425; 219/136, 137 R; 228/164, 165, 228/166, 167, 168, 169, 170, 171, 172, 173, 228/174; 428/544, 548, 586, 596, 597, 598
See application file for complete search history.

(56) References Cited

U.S. PATENT DOCUMENTS

| | | | | |
|---|---|---|---|---|
| 1,016,584 A | * | 2/1912 | Shepherd et al. ............ 138/165 |
| 1,298,100 A | * | 3/1919 | Royce ......................... 384/276 |
| 2,140,672 A | * | 12/1938 | Gray et al. .................... 156/92 |
| 3,531,854 A | * | 10/1970 | Williams ..................... 228/170 |
| 3,815,296 A | * | 6/1974 | Crutcher ........................ 52/45 |
| 4,004,124 A | * | 1/1977 | Nakane et al. ............... 296/191 |
| 4,046,988 A | * | 9/1977 | Okuda et al. ............ 219/137 R |
| 4,183,455 A | * | 1/1980 | Reynolds ..................... 228/170 |
| 4,993,621 A | * | 2/1991 | Koy et al. ................. 228/173.6 |
| 5,022,581 A | * | 6/1991 | Zimmer ...................... 228/164 |
| 5,186,382 A | * | 2/1993 | Doughty ..................... 228/135 |
| 5,505,365 A | * | 4/1996 | Olsen ......................... 228/135 |
| 5,784,784 A | * | 7/1998 | Flanigan et al. .......... 29/890.08 |
| 6,158,547 A | * | 12/2000 | Ackermann et al. ......... 181/256 |
| 6,754,945 B2 | * | 6/2004 | Fujan et al. .................... 29/557 |
| 6,882,696 B2 | * | 4/2005 | Nakayama et al. .......... 376/327 |
| 7,367,099 B2 | * | 5/2008 | Painchault et al. ....... 29/407.01 |

FOREIGN PATENT DOCUMENTS

DE    29 09 201    7/1779
JP    54056960 A * 5/1979

* cited by examiner

*Primary Examiner*—Jeffrey Donels
*Assistant Examiner*—Forrest M Phillips
(74) *Attorney, Agent, or Firm*—Howard IP Law Group, PC

(57) ABSTRACT

An arrangement of parts having a first part in the form of sheet metal which is in contact with the second part along an edge and is fixedly connected to the second part via at least one weld. To reduce stress peaks at the ends of welds, the first part has a slot in a section adjacent to the respective end of the weld, the slot beginning at the edge and extending to its end with a curved profile a curve bent by at least 180° up to its end.

40 Claims, 2 Drawing Sheets

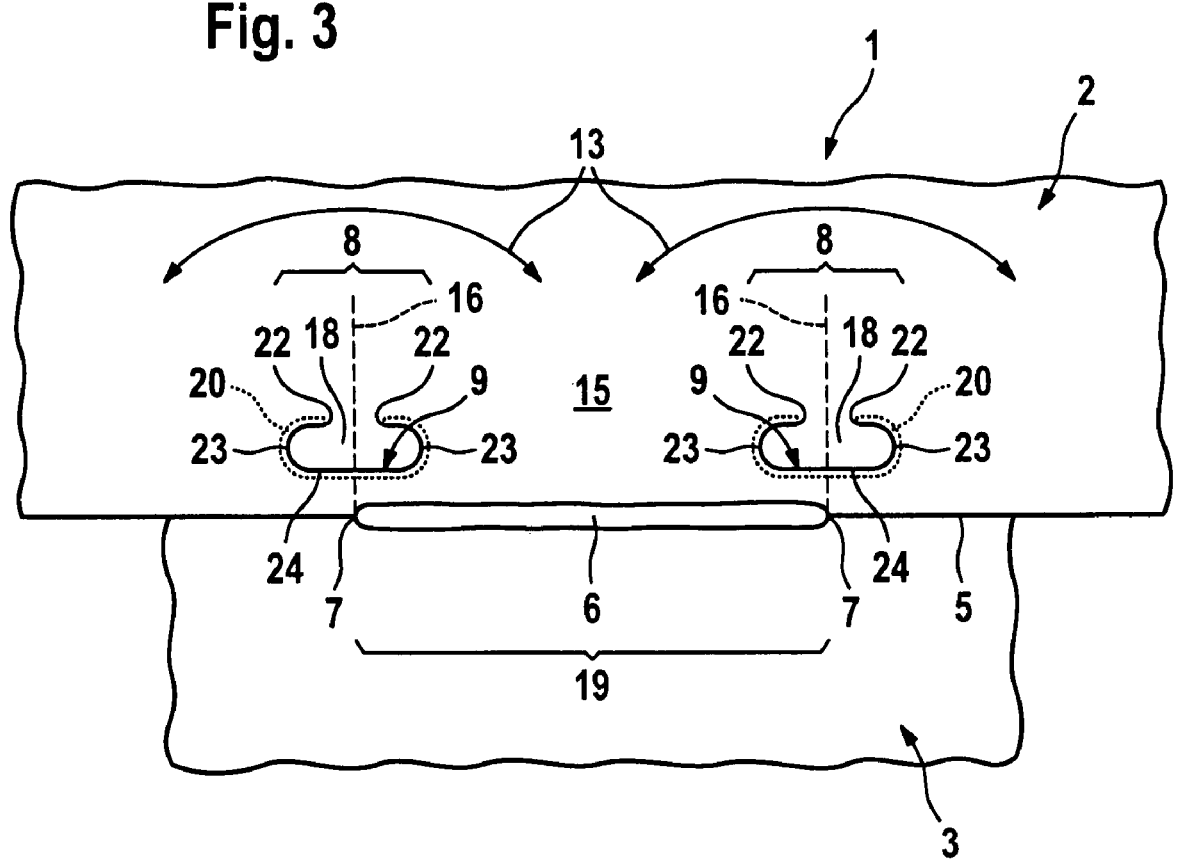

ARRANGEMENT OF PARTS AND A RESPECTIVE MANUFACTURING METHOD

This application claims foreign priority of German Patent Application No. DE 10 2006 016 096.1, filed Apr. 4, 2006 in Germany, which application is incorporated herein by reference in its entirety.

FIELD OF THE INVENTION

The present invention relates generally to an arrangement of parts, joined together by at least one weld and to a method for manufacturing such an arrangement of parts, and more particularly to a muffler for a line carrying gas and airborne sound, in particular for an exhaust system for an internal combustion engine.

BACKGROUND OF THE INVENTION

In many applications, a first sheet metal part must be attached to another part along an edge. Welds that extend only along a portion of the edge of the first part are preferred here. For example, partitions or intermediate plates are attached to a housing of a muffler, separating two chambers from one another in the housing in the case of mufflers in an exhaust system for an internal combustion engine, for example. Such partitions or intermediate plates may at the same time serve to reinforce the housing. Essentially any other applications of such arrangements of parts in the components of an exhaust system or outside of exhaust systems are also conceivable. Furthermore, such an arrangement of parts is fundamentally not limited to metallic parts because plastic parts can also be joined together via plastic welds.

During operation or use of a component that is provided with an arrangement of parts of the type defined above, there may be a transfer of force between the two parts via the respective weld. Such forces may be caused by mechanical loads and/or by thermally induced expansion effects, for example. It has been found that a flow of force via the weld between the two parts at the ends of the weld leads to force peaks, which are attributed to the notching effect prevailing there. The mechanical load on the arrangement of parts is thus especially great at the ends of the welds, where there is a risk of premature cracking and damage to the arrangement of parts.

SUMMARY OF THE INVENTION

The present invention relates to providing for an arrangement of parts so that, in particular the lifetime of the arrangement of parts is improved, while at the same time inexpensive manufacturing of the arrangement of parts may be accommodated.

The invention is based on the general idea that a first sheet metal part is provided with a slot in a section adjacent to one end of a weld, the slot uncoupling due to its shape the respective end of the weld from the flow of forces through the first part. The slot may be shaped in a targeted manner, so that it begins at the edge of the first part facing a second part and ends after a curve with a bend of at least 180 degrees (180°). Alternatively, the slot may also be shaped in a targeted manner so that it has a C-type shape and is spaced a distance away from the edge and from the weld, said C-shape being open in the direction away from the edge. The respective design achieves the result that the respective end of the weld is uncoupled from the first part with regard to the flow of force, so that the development of a force peak is greatly reduced at this end of the weld. Furthermore, due to the shaping of the slot, this achieves the result that the development of a force peak is definitely reduced even at an end of the slot at a distance away from the edge of the first part because this end is also separated or uncoupled, from the flow of force through the first part due to the slot. The inventive arrangement of parts is thus more or less free of critical load peaks or stress peaks in the area of the first part comprising the respective end of the weld and the slot assigned to this end of the weld, because the targeted shaping of the slot causes the flow of force to pass by the critical locations within the first part, i.e., to pass by the respective end of the weld and the end of the slot at a distance from the edge.

Due to the elimination of dangerous stress peaks within the arrangement of parts, their lifetime can be increased significantly. This is all the more true when such slots are provided in the area of the two ends of the weld. The increased stability may of course also be utilized to allow the use of less expensive materials for the parts and less expensive manufacturing methods for the entire arrangement of parts.

Fundamentally, the respective slot may be manufactured by a suitable cutting operation with or without removal of material. However, in one embodiment the respective slot is manufactured by punching back or through an area of the first part that is situated in a section adjacent to the respective end of the weld, e.g., by means of a corresponding punching operation. The limit of this punched-out or punched-through area then forms the respective slot with the desired shape. Such a punching operation can be implemented without cutting, so the tool used can achieve a long lifetime, which reduces the overall manufacturing cost of the arrangement of parts. The punched-out or punched-through areas are characterized in that they are arranged with an offset in the direction of the thickness of the first part with respect to the regions of the first part adjacent along the slot.

It is self-evident that the features mentioned above and those yet to be explained below may be used not only in the particular combination given but also in other combinations or alone without going beyond the scope of the present invention.

Exemplary embodiments of the invention are illustrated in the drawings and explained in greater detail in the following description, where the same reference numerals are used to refer to the same or similar or functionally identical parts.

BRIEF DESCRIPTION OF THE DRAWINGS

In the drawings schematically:

FIG. 3 shows a view like that in FIG. 1 but in another embodiment.

DETAILED DESCRIPTION OF THE INVENTION

Figure 1:
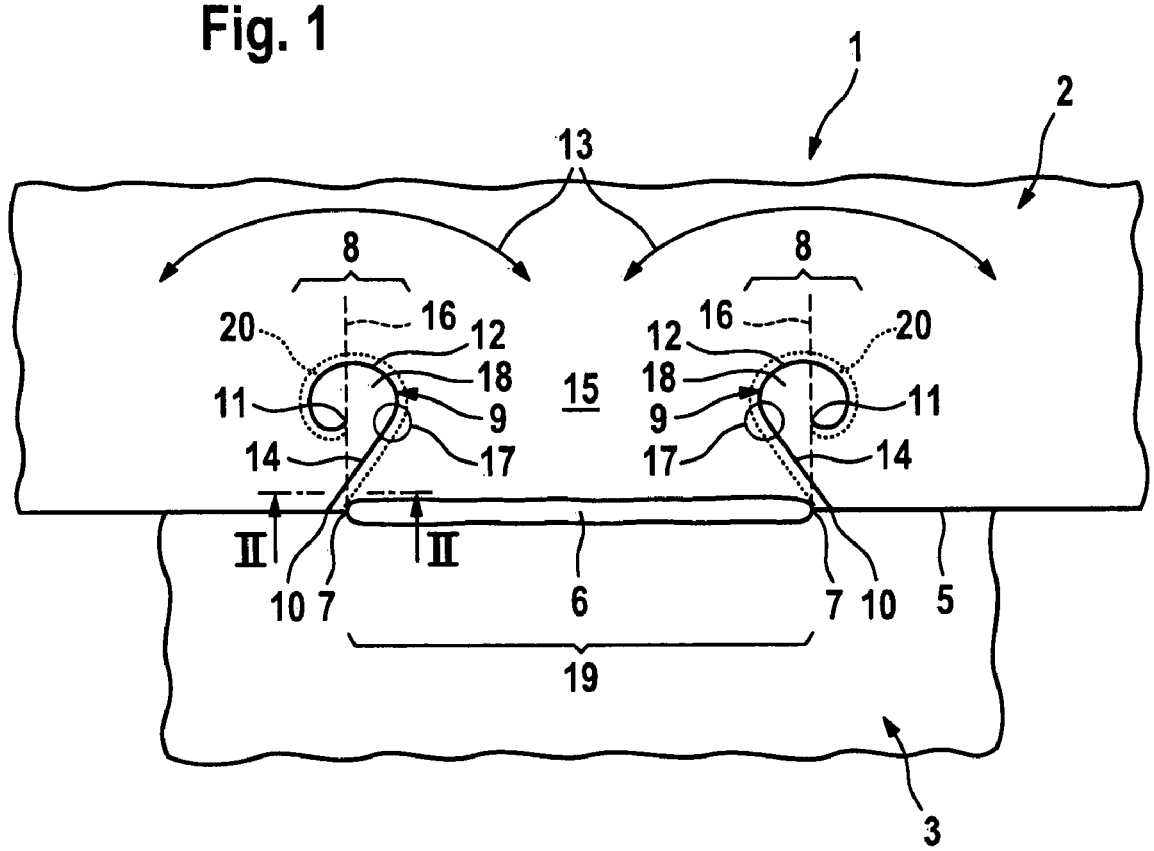
FIG. 1 shows a simplified basic top view of an arrangement of parts.
Figure 2:
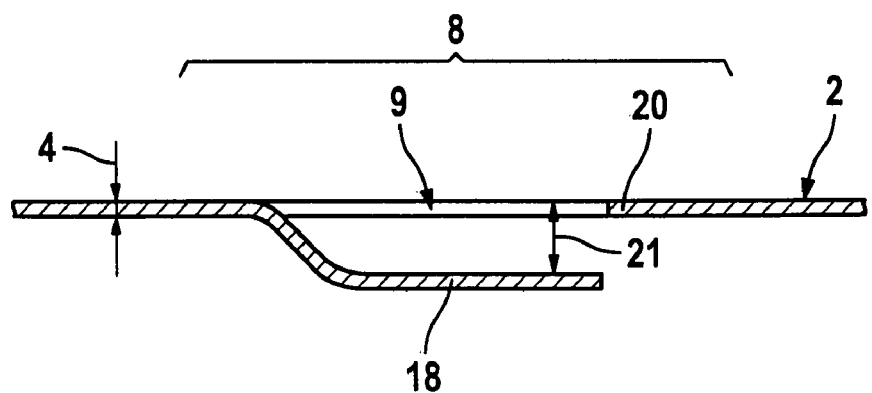
FIG. 2 shows an enlarged detail of the arrangement of parts in a section according to sectional lines 11 in FIG. 1.

According to FIGS. 1 through 3, an arrangement of parts 1 comprises at least two parts, namely a first part 2 and a second part 3. The first part 2 is designed in the form of sheet metal, i.e., in a Cartesian coordinate system, the first part 2 has a smaller dimension in its thickness direction 4 or thickness 4, which is shown in FIG. 2, than in its width direction or in its length direction. The first part 2 is thus comparatively flat. The first part 2 need not extend in a plane but may essentially also have any three-dimensional course. In contrast with that, the second part 3 may fundamentally have any shape. In particular, the second part 3 may also be designed in the form of sheet metal, in which case it then also runs at an inclination in comparison with the first part 2.

The parts 2, 3 may each be made of a plastic. However, the present arrangement of parts 1 is particularly advantageous when the parts 2, 3 are each made of metal. In this case, the first part 2 is expediently made of sheet metal or a sheet metal part.

In an exemplary application, the arrangement of parts 1 is provided or designed in a part of an exhaust system that is not shown in detail here. This component may be, for example, a muffler, in particular a rear muffler or a middle muffler or a front muffler. Likewise, the component may be a particulate filter or a catalytic converter. Likewise, combinations of a muffler, a particulate filter and/or a catalytic converter are also conceivable. The exhaust system whose component may be provided with the arrangement of parts 1 is suitable for use with an internal combustion engine, which may be installed in a motor vehicle, for example.

For example, the second part 2 may be a partition that separates two spaces from one another in a muffler, e.g., in a rear muffler. One of the spaces may be an absorption space, which may be filled with an acoustical material or a sound absorbing material. With a rear muffler, a pipe carrying exhaust gas is passed through such an absorption space, whereby said pipe is designed to be permeable for airborne sound in the radial direction within the absorption space, e.g., by means of perforations. Said partition, i.e., the first part 2, is then attached to a housing of the muffler, which then forms the second part 3 of the arrangement of parts 1.

In the arrangement of parts 1, the first part 2 is in contact with the second part 3 along an edge 5. The first part 2 is attached to the second part 3 by means of a weld 6, which extends along a part of the edge 5. The weld 6 is shorter than the edge 5 and is limited in its longitudinal direction by weld ends 7. The weld 6 is produced by build-up welding, for example, using a suitable welding material.

With the inventive arrangement of parts 1, the first part 2 has a slot 9 at least in a section 8 adjacent to the one end 7 of the weld. In the example shown here, the first part 2 is provided with such a slot 9 in both sections 8, each being assigned to one of the ends 7 of the weld. The respective slot 9 penetrates through the first part 2 completely in the direction 4 of its thickness.

In the exemplary embodiment illustrated in FIG. 1, the respective slot 9 is shaped so that it begins at the edge 5 of the first part 2, ends at a distance from the edge 5 and has a curved or bent profile 12 between its beginning, which is labeled as 10, and its end, which is labeled as 11. This curved profile 12 is bent by at least 180° with respect to an axis to the first part 2, extending in particular in the direction 4 of the thickness of the first part 2.

In the exemplary embodiment shown in FIG. 3, the respective slot 9 has a C shape which is open in the direction facing away from the edge 5 and is a distance apart from the edge 5 as well as from the weld 6. The respective slot 9 thus begins and ends within the first part 2. The two ends of the respective slot 9 are labeled as 22 in FIG. 3. The respective C-shape refers to a direction of viewing oriented in the direction 4 of thickness.

The targeted shaping of the respective slot 9 has the effect that a flow of force 13 (indicated by double arrows) within the first part 2 is carried into or away from the weld 6 in such a way that essentially no force peaks or stress peaks can develop in the area of the weld ends 7 and in the area of the ends 11 and/or 22 of the respective slot 9. To this end, the shaping of the slots 9 is selected so that the weld ends 7 as well as the slot ends 11, 22 can be separated and/or uncoupled from the flow of force 13 by the slot 9. The material of the first part 2 is thus not involved in the transfer of force in the area of the weld end 7 and the slot end 11, 22 as that the flow of force 13 is diverted due to the slot 9.

The reduction in the force peaks and stress peaks at the weld ends 7 and at the slot ends 11 can be improved and/or optimized in the embodiment according to FIG. 1 by the fact that the curved profile 12 of the respective slot 9 is curved away from the weld 6. In the example shown in FIG. 1, the curved profile 12 of the slot 9 shown at the right is thus curved clockwise, whereas with the slot 9 in the curved profile 12 shown on the left is curved counterclockwise. The curved profiles 12 of the slots 9 here are curved at least 270° and in particular approximately 360°. This makes it possible to uncouple the slot end 11 from the flow of force 13 in an effective manner. It is understood, however, that embodiments of the present invention may include structures wherein the curved profile 12 of the respective slot 9 is curved toward the weld 6.

In the embodiments shown here according to FIG. 1, the respective slot 9 also has a linear profile 14 connecting the respective curved profile 12 to the start 10 of the respective slot 9 in an essentially linear form. To improve the uncoupling of the respective weld end 7 from the flow of force 13, the respective linear profile 14 may preferably be inclined toward the weld 6.

In a section of the first part 2 assigned to the weld 6, an imaginary or virtual strip 15 may be defined in the first part 2, bordered by the weld 6 with respect to the second part 3 and bordered at the side by imaginary or virtual straight lines 16. The imaginary lines 16 are perpendicular to the edge 5 and each begins at one of the weld ends 7. The slots 9 may extend at least partially within the aforementioned strip 15.

In the embodiment shown in FIG. 1, for example, a transition 17 symbolized by a circle between the linear profile 14 and the curved profile 12 of the respective slot 9 may be arranged within the aforementioned strip 15. In the embodiment shown in FIG. 3, with the slots 9, the end sections 23 that are arranged closer to the weld 6 are also arranged within the aforementioned strip 15. This yields a certain overlapping of the slots 9 in relation to the weld 6 within the strip 15.

In the embodiment shown in FIG. 3, the slot 9 thus has two end sections 23, each including one of the ends 22 and with one developing into the other via a central section 24, which is linear in this case. The linear section 24 is oriented so that it extends parallel to the edge 5. Within the end sections 23 the respective slot 9 is preferably curved by approximately 180°. Essentially the end section 23 may also be curved by more than 180°. However, the embodiment shown here illustrates the end sections 23 are each curved in an approximately semicircular shape. The respective bending of the end sections 23 here again relates to an axis to the first part 2 which extends in particular in the direction 4 of the thickness of the first part 2. The bending of the two end sections 23 is performed with each slot 9 so that the two end sections 23 have a concave curvature with respect to one another. In particular, the respective slot 9 may be adapted to have mirror symmetry within itself.

The slots 9 assigned to the two weld ends 7 may have mirror symmetry with one another.

The slot 9 may essentially be produced in any way. In particular, the slot 9 may also be cut into the first part 2, whereby cutting and non-cutting methods may be used. The slot 9 may be manufactured by a punching operation, such that in this operation, an area 18 of the first part 2 is punched-out and/or punched-through at the same time. This is explained in greater detail below.

According to FIG. 2, in the section 8 assigned to the respective slot 9 which is adjacent to the weld 6, the first part 2 has an area 18 which is cut through the respective slot 9 from a section of the edge 5 labeled as 19. The edge section 19 is fixedly connected to the second part 3 via the weld 6. The cut-out area 18 is arranged at least partially opposite an area labeled as 20 and indicated by a dotted line, the area 20 being arranged in proximity to the cut-out area 18 with an offset in the direction 4 of thickness. This offset arrangement of the cut-out area 18 with respect to the area 20 adjacent along the slot 9 is achieved by the aforementioned punching this area 18 out and/or through in relation to the remainder of the first part 2. The slot 9 is created simultaneously with the punching out and/or punching through operation in relation to the aforementioned region 18. The offset 21 between the cut-out region and the region 20 adjacent along the slot 9 may also turn out to be much smaller than that shown in FIG. 2. In particular it is fundamentally sufficient to select the offset 21 to be as large as the thickness 4 of the first part 2.

In addition to the simplified production of the slot 9, the selected manufacturing method also has the advantage that no significant opening is formed in the first part 2 due to the design of the respective slot 9. This is advantageous in particular when the first part 2 serves to border a filled space, e.g., functioning as a partition for an absorption chamber filled with absorbent material. The absorbent material cannot escape from the absorption chamber through the slot 9. Through a suitable choice of the offset 21, an opening optionally formed due to the shape of the slot 9 through the punched-out or punched-through area 18 remains essentially sealed.

The arrangement of parts 1 may be manufactured by first punching out or punching through the respective area 18 within the section 8 of the first part 2 that is provided to form the respective slot 9, in particular by a corresponding punching operation, thereby forming the respective slot 9. Then the first part 2 is attached to the second part 3 with the help of the weld 6.

The invention claimed is:

1. An arrangement of parts comprising:
   a first part in the form of sheet metal; and
   a second part, said second part being in contact with said first part along an edge and fixedly connected to said first part via a weld extending along the edge,
   wherein said first part has a slot penetrating through said first part in at least one section adjacent to one end of said weld, said slot beginning at an edge of the first part and adjacent said weld, the slot having a curved profile, said curved profile being curved by at least 180° up to its end at a distance from the edge of the first part.

2. The arrangement of parts according to claim 1, wherein said curved profile of said slot is curved away from the weld.

3. The arrangement of parts according to claim 1, wherein said curved profile of said slot is curved by at least 270°.

4. The arrangement of parts according to claim 1, wherein said curved profile of said slot is curved with regard to an axis extending in a direction of the thickness of said first part.

5. The arrangement of parts according to claim 1, wherein said slot has a substantially linear profile between its beginning situated at the edge of said first part and said curved profile.

6. The arrangement of parts according to claim 5, wherein said linear profile of the respective slot is inclined toward said weld.

7. The arrangement of parts according to claim 5, wherein a transition between said linear profile and said curved profile of said slot is arranged within a strip of said first part that is bordered laterally by imaginary lines beginning at the ends of said weld and standing perpendicular to the edge of said first part.

8. The arrangement of parts according to claim 1, wherein an area of the section of said first part adjacent to said weld which is cut out by said slot from a section of the edge of the first part connected fixedly to said second part via said weld is at least partially arranged with an offset with respect to an area of the first part in a thickness direction of the first part along the slot.

9. The arrangement of parts according to claim 8, wherein said offset of the cut-out area is implemented by punching this area out or through in relation to the remainder of said first part.

10. The arrangement of parts according to claim 8, wherein said slot is produced by punching the respective area out or through.

11. The arrangement of parts according to claim 1, wherein said slot extends at least partially in a strip of the first part which is bordered laterally by imaginary straight lines beginning at the ends of said welds and standing perpendicular to the edge of said first part.

12. The arrangement of parts according to claim 1, wherein said weld has a second end terminating the weld along said edge and opposite said one end, wherein said first part is provided with a second slot having a beginning at an edge of the first part and adjacent to the second end of said weld.

13. The arrangement of parts according to claim 1, wherein said first part and said second part are each made of metal.

14. The arrangement of parts according to claim 1, wherein said arrangement of parts is positioned in a component of an exhaust system of an internal combustion engine, in particular in a motor vehicle.

15. The arrangement of parts according to claim 1, wherein said arrangement of parts is positioned in a muffler.

16. The arrangement of parts according to claim 1, wherein said first part is a partition separating two chambers from one another in a muffler.

17. The arrangement of parts according to claim 16, wherein sound absorbing material is provided in one of said chambers of the muffler.

18. The arrangement of parts according to claim 1, wherein said second part is a housing of a muffler.

19. An arrangement of parts comprising:
   a first part in the form of sheet metal; and
   a second part;
   wherein said first part is in contact with said second part along one edge and fixedly connected to said second part by a weld extending along the edge, the weld having a first end that terminates the weld at a position along said edge, and
   wherein said first part has a first slot penetrating through said first part in a first section adjacent to the first end of said weld, said slot being at a distance from the edge and from said weld and having a curved profile that is substantially C shaped, said C-shaped profile being open in the direction facing away from the edge.

20. The arrangement of parts according to claim 19, wherein said slot has a linear section extending parallel to said edge between its ends.

21. The arrangement of parts according to claim 19, wherein said slot is curved by at least approximately 180° in its end sections.

22. The arrangement of parts according to claim 19, wherein said end sections are curved in a semicircular shape.

23. The arrangement of parts according to claim 19, wherein said end sections are curved so they are concave to one another.

24. The arrangement of parts according to claim 20, wherein said end sections are joined together by the linear section.

25. The arrangement of parts according to claim 19, wherein said end section arranged closer to said weld is within a strip of said first part that is bordered laterally by imaginary lines beginning at the ends of said weld and standing perpendicular to the edge of said first part.

26. The arrangement of parts according to claim 19, wherein an area of the section of said first part, said section being adjacent to the weld, which area is cut out by the said slot from a section of the edge of said first part, said area being at least partially arranged with an offset with respect to an area of said first part in a thickness direction of said first part along said slot.

27. The arrangement of parts according to claim 26, wherein said offset of said cut-out area is implemented by punching this area out or through in relation to the remainder of said first part.

28. The arrangement of parts according to claim 26, wherein said slot is produced by punching the respective area out or through.

29. The arrangement of parts according to claim 19, wherein said slot extends at least partially in a strip of said first part which strip is bordered laterally by imaginary straight lines beginning at the ends of said weld and standing perpendicular to the edge of said first part.

30. The arrangement of parts according to claim 19, wherein said weld has a second end terminating the weld along said edge and opposite said first end, and wherein said first part is provided with a second slot in a second section adjacent to said second end of said weld.

31. The arrangement of parts according to claim 19, wherein said first part and said second part are each made of metal.

32. The arrangement of parts according to claim 19, wherein the arrangement of parts is positioned in a component of an exhaust system of an internal combustion engine, in particular in a motor vehicle.

33. The arrangement of parts according to claim 19, wherein said arrangement of parts is positioned in a muffler.

34. The arrangement of parts according to claim 19, wherein said first part is a partition separating two chambers from one another in a muffler.

35. The arrangement of parts according to claim 34, wherein sound absorbing material is provided in one of said chambers of the muffler.

36. The arrangement of parts according to claim 19, wherein said second part is a housing of a muffler.

37. A method for manufacturing an arrangement of parts, said method comprising the steps of:
forming a slot through at least one area of a first part, the slot beginning at an edge of the first part and ending a distance away from the edge, the slot having a curved profile between its beginning and its end; and
fastening said first part to a second part by a weld extending along an edge of the first part and ending at a position adjacent the beginning of the slot, said curved profile being curved by at least 180° with respect to an axis to the first part extending in the direction of the thickness of the slot.

38. A method for manufacturing an arrangement of parts, said method comprising the steps of:
forming a slot through at least one area of a first part; and
fastening said first part to a second part by a weld extending along an edge of the first part such that the weld is adjacent to the slot,
wherein the slot is at a distance from the edge and from said weld and has a substantially C-shaped profile that is open in the direction facing away from the edge.

39. The method of claim 37, wherein the step of forming the slot further comprises punching out or through the at least one area of the first part.

40. The method of claim 38, wherein the step of forming the slot further comprises punching out or through the at least one area of the first part.

* * * * *